A. SELLGREN.
CAR DOOR.
APPLICATION FILED AUG. 9, 1920.

1,427,915.

Patented Sept. 5, 1922.
2 SHEETS—SHEET 1.

WITNESS:
O. L. Osgood
H. Reinshagen

INVENTOR.
Axel Sellgren
BY
H. J. Sanders
ATTORNEY.

A. SELLGREN.
CAR DOOR.
APPLICATION FILED AUG. 9, 1920.
1,427,915.
Patented Sept. 5, 1922.
2 SHEETS—SHEET 2.
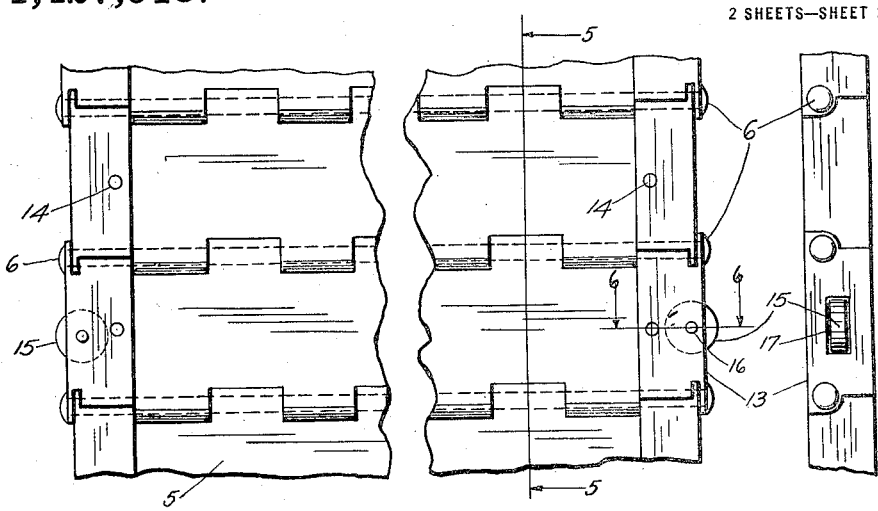
FIG. 3
FIG. 4
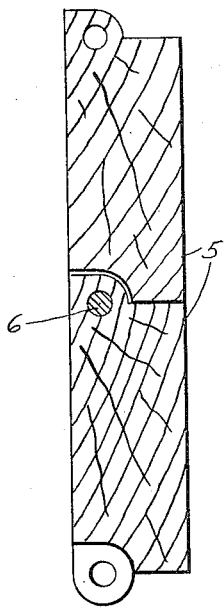
FIG. 5
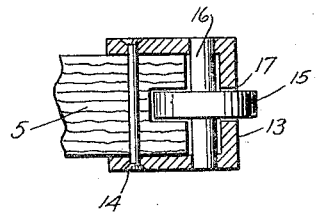
FIG. 6
WITNESS:
INVENTOR.
Axel Sellgren
BY
H.J. Sanders
ATTORNEY.

Patented Sept. 5, 1922.

1,427,915

UNITED STATES PATENT OFFICE.

AXEL SELLGREN, OF WINNIPEG, MANITOBA, CANADA.

CAR DOOR.

Application filed August 9, 1920. Serial No. 402,474.

*To all whom it may concern:*

Be it known that I, AXEL SELLGREN, a citizen of Sweden, residing at Winnipeg, in the Province of Manitoba and Dominion of Canada, have invented certain new and useful Improvements in Car Doors, of which the following is a specification.

This invention relates to improvements in car doors and more particularly to freight car doors and one object is to provide a close fitting or "grain-tight" flexible door that can be drawn up and out of the way into open position and that in lowered or closed position will effectually prevent leakage of grain from the car at the doors thereof. While the door is particularly adapted for use on grain cars it can, of course, be used to advantage on box cars generally. A further object is to provide a door that is simple in construction, inexpensive to manufacture, and efficient in use.

With the foregoing and other objects in view the invention consists in the combination and arrangement of parts to be hereinafter fully described, pointed out in the appended claim and illustrated in the accompanying drawings which form a part of this application and in which—

Fig. 3 is an enlarged fragmentary view of the door.

Fig. 4 is an edge view of Fig. 3.

Fig. 5 is a section on line 5—5 of Fig. 3.

Fig. 6 is a section taken on line 6—6 of Fig 3.

Like reference characters denote corresponding parts throughout the several views.

Figure 1:
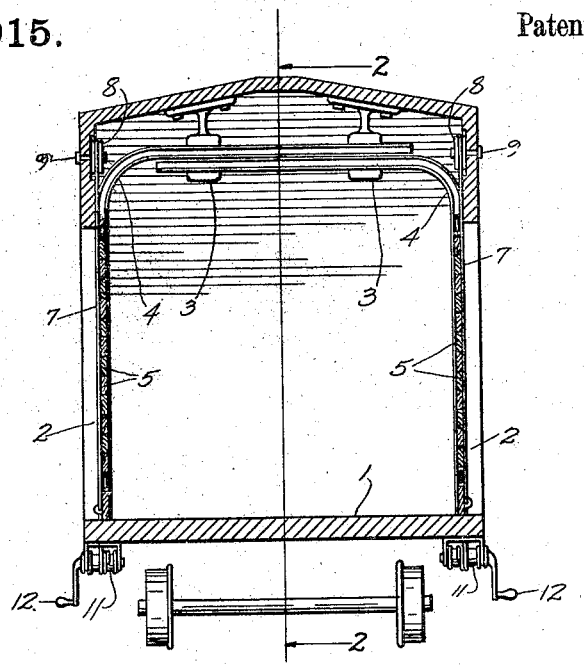
Fig. 1 is a cross sectional view of a freight car provided with my improved door and door-operating mechanism.
Figure 2:
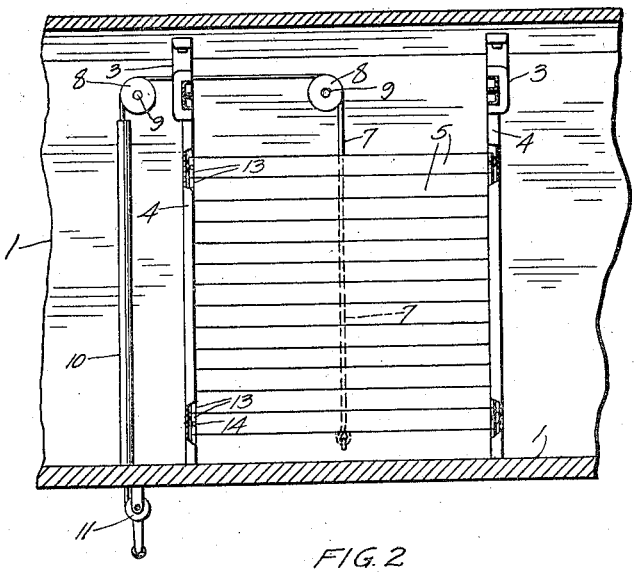
Fig. 2 is a section taken on line 2—2 of Fig. 1.

The reference numeral 1 denotes a freight car having the door openings 2. Secured to and depending from the roof of the car 1 are the brackets 3 that support the inwardly extending ends of the channelled door guides 4, said guides extending to and down the sides of the car upon opposite sides of each door opening 2, the guides upon opposite sides of each door opening having their open faces turned toward each other to receive the sliding door which is made up of a plurality of leaves 5 hinged together upon the pintles 6. Secured to the leaf 5 at the bottom of each door is a cord 7 which extends up and over the guide pulleys 8 disposed in recesses in the sides of the car upon the pins 9 that extend through the sides of the car, said cords 7 then passing through the tubular standards 10, arranged inside the car against the sides thereof, and through perforations in the car floor and being secured to the windlasses 11 secured to the under side of the car floor, said windlasses being operated by the handles 12. The doors are readily raised out of the door openings 2 into open position by winding the cords 7 upon the windlasses. The doors may be returned to closed position by gravity or by manually moving them to such position by an operator inside the car.

The lateral edges of the door or the ends of each leaf 5 are covered by the channelled metal strips 13 secured in place by the pins 14, said strips riding in the channelled guides 4. Two or more of the leaves 5 at or near opposite ends of the door are formed with terminal notches to receive the rollers 15 arranged upon pins 16 journaled in said strips, said rollers extending out through perforations 17 in said strips and bearing against the channelled guides 4 to reduce the friction incident to operation of the door. The cars are usually loaded with grain from a trap door in the roof with the side doors in closed position.

What is claimed is:—

In a car door, a plurality of leaves hingedly connected, channelled sectional metal strips covering the ends of said leaves and a portion of the sides thereof, said strips being hingedly connected, certain of said leaves having notches in the opposite end edges thereof, said strips adjacent said notches being perforated, rollers journalled in the side portions of said strips and disposed in said notches and extending through the perforations in said strips, to project from the ends of said leaves, channelled guide members for the ends of said leaves and adapted to receive the covered ends therein whereby the rollers will bear against one face of the guides and the side portions of the sectional strips will slidably engage the side portions of the guides, said guides being curved to dispose the door in raised position at substantially a right angle to its closed position, and means for raising and lowering said door.

In testimony that I claim the foregoing as my own I have hereto affixed my signature in the presence of two subscribing witnesses.

AXEL SELLGREN.

Witnesses:
ALEX. FREEMAN,
JOHN CHRISTOPHERSON.